(12) United States Patent
Kitada et al.

(10) Patent No.: US 12,104,129 B2
(45) Date of Patent: Oct. 1, 2024

(54) PIPE STRUCTURE, GASIFICATION COMBINED CYCLE POWER GENERATION DEVICE, AND PIPE STRUCTURE ASSEMBLY METHOD

(71) Applicant: Mitsubishi Power, Ltd., Yokohama (JP)

(72) Inventors: Masashi Kitada, Tokyo (JP); Fumihiro Chuman, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 913 days.

(21) Appl. No.: 17/050,191

(22) PCT Filed: May 16, 2018

(86) PCT No.: PCT/JP2018/018909
§ 371 (c)(1),
(2) Date: Oct. 23, 2020

(87) PCT Pub. No.: WO2019/220559
PCT Pub. Date: Nov. 21, 2019

(65) Prior Publication Data
US 2021/0087482 A1 Mar. 25, 2021

(51) Int. Cl.
*C10J 3/48* (2006.01)
*C10J 3/82* (2006.01)
(Continued)

(52) U.S. Cl.
CPC . *C10J 3/48* (2013.01); *C10J 3/82* (2013.01); *F16L 9/18* (2013.01); *F16L 57/06* (2013.01);
(Continued)

(58) Field of Classification Search
CPC ......... F16L 59/12; F16L 23/02; F16L 58/187; F16L 59/14; F16L 23/125; F16L 59/21;
(Continued)

(56) References Cited

U.S. PATENT DOCUMENTS 4,281,859 A * 8/1981 Davies .................. F16L 58/187
285/55
4,363,504 A * 12/1982 De Feo ................... F16L 59/21
285/133.11
(Continued)

FOREIGN PATENT DOCUMENTS

CN 1051616 A * 5/1991 ............. F16L 59/12
CN 102714068 A * 10/2012 ................ F16L 1/00
(Continued)

OTHER PUBLICATIONS

International Search Report dated Aug. 14, 2018, issued in counterpart application No. PCT/JP2018/018909, with English translation. (6 pages).
(Continued)

*Primary Examiner* — Imran Akram
(74) *Attorney, Agent, or Firm* — WHDA, LLP (57) ABSTRACT

In order to allow for thermal elongation of a liner, a pipe member, in the interior of which flows a fluid containing solids, is provided with: a tubular outer pipe; a single tubular liner provided inside the outer pipe with a gap therebetween in the radial direction, or a plurality thereof arranged serially in the direction of the pipe axis C; a refractory material filled in between the outer pipe and the liner; a first liner holding member that is provided on an end portion side of the outer pipe, and that holds the liner arranged on the end portion side in a restrained state in the pipe axis C direction and the circumferential direction around the pipe axis C; and a second liner holding member that is provided on an end portion side of the outer pipe, and that holds the liner arranged on the end portion side.

15 Claims, 5 Drawing Sheets

(51) Int. Cl.
    *F16L 9/18*     (2006.01)
    *F16L 57/06*     (2006.01)
    *F16L 59/14*     (2006.01)
    *F23G 5/027*     (2006.01)

(52) U.S. Cl.
    CPC .............. *F16L 59/14* (2013.01); *F23G 5/027* (2013.01); *C10J 2200/09* (2013.01); *C10J 2300/1625* (2013.01)

(58) Field of Classification Search
    CPC ................... F16L 51/00; C10J 2200/09; C10J 2300/1653; C10J 3/48
    See application file for complete search history.

(56) References Cited

U.S. PATENT DOCUMENTS

| | | | | |
|---|---|---|---|---|
| 4,691,740 | A | * | 9/1987 | Svetlik .................. F16L 55/165 138/104 |
| 5,078,182 | A | | 1/1992 | Kraft |
| 5,127,116 | A | * | 7/1992 | Greig ........................ F16L 1/00 285/21.2 |
| 5,167,430 | A | * | 12/1992 | Bainbridge ......... F16L 27/1004 60/322 |
| 7,107,662 | B1 | * | 9/2006 | Levario ................. F16L 23/167 285/55 |
| 2011/0170650 | A1 | | 7/2011 | Wepfer |
| 2013/0014851 | A1 | * | 1/2013 | Gallagher ............... F16L 47/06 138/155 |
| 2017/0341119 | A1 | * | 11/2017 | Toguyeni ............... F16L 58/08 |

FOREIGN PATENT DOCUMENTS

| | | | | |
|---|---|---|---|---|
| CN | 102066824 B | * | 7/2014 | ............. C04B 38/06 |
| FR | 2947032 A1 | * | 12/2010 | .......... F16L 23/0283 |
| JP | S55-20935 A | | 2/1980 | |
| JP | S56-55791 A | | 5/1981 | |
| JP | S62-22395 U | | 2/1987 | |
| JP | S62-60595 B2 | | 12/1987 | |
| JP | H05-231586 A | | 9/1993 | |
| JP | H05-94798 U | | 12/1993 | |
| JP | H05-332163 A | | 12/1993 | |
| JP | H107-38968 B2 | | 5/1995 | |
| JP | H07-190286 A | | 7/1995 | |
| JP | H109-14577 A | | 1/1997 | |
| JP | H09-133255 A | | 5/1997 | |
| JP | H09-166274 A | | 6/1997 | |
| JP | H09-250685 A | | 9/1997 | |
| JP | H10-47586 A | | 2/1998 | |
| JP | H11-304085 A | | 11/1999 | |
| JP | 2000-346267 A | | 12/2000 | |
| JP | 2002-31275 A | | 1/2002 | |
| JP | 3435504 B2 | | 8/2003 | |
| JP | 3637429 B2 | * | 4/2005 | ............. F16L 59/12 |
| JP | 2005-282996 A | | 10/2005 | |
| JP | 2007-292237 A | | 11/2007 | |
| JP | 4397064 B2 | | 1/2010 | |
| JP | 2013-130087 A | | 7/2013 | |

OTHER PUBLICATIONS

Written Opinion dated Aug. 14, 2018, issued in counterpart application No. PCT/JP2018/018909, with English translation. (19 pages).

Office Action dated Dec. 10, 2019, issued in counterpart JP application No. 2016-225056, with English translation. (10 pages).

Office Action dated Aug. 31, 2021, issued in counterpart CN Application No. 201880092629 X, with English Translation. (27 pages).

* cited by examiner

PIPE STRUCTURE, GASIFICATION COMBINED CYCLE POWER GENERATION DEVICE, AND PIPE STRUCTURE ASSEMBLY METHOD

TECHNICAL FIELD

The present invention relates to a pipe member, a gasification combined power generation device, and an assembling method for a pipe member.

BACKGROUND ART

In the related art, a carbon-containing fuel gasification facility (coal gasification facility) that generates a combustible gas by supplying a carbonaceous feedstock such as coal into a gasifier and partially combusting and gasifying the carbonaceous feedstock is known as a gasifier facility.

For example, in a raw syngas pipe of such a gasifier facility, through which a raw syngas is transported from a gasifier outlet to a char recovery unit, the raw syngas flowing in the pipe contains char, which is an unreacted content and ash content of coal. Due to the char, an inner peripheral surface of the raw syngas pipe is worn, and thus a wall thickness of the raw syngas pipe decreases. In addition, since sulfide included in the raw syngas also causes high-temperature sulfide corrosion on the inner peripheral surface of the raw syngas pipe, both of wear resistance and corrosion resistance are required.

Although there is also a method of performing build-up welding of a nickel-containing alloy material such as stainless steel on a portion of the raw syngas pipe, in which a wall thickness decrease or corrosion is observed, to ensure corrosion resistance, cracks are generated in the welded portion in some cases, increasing costs. Thus, improvement is desired as a countermeasure.

In addition, although there is also a method of laying a tile-shaped wear-resistant liner on a pipe inner peripheral surface in order to enhance the wear resistance of the pipe inner peripheral surface, the wear-resistant liner comes off due to an effect of a high-temperature gas flowing in the pipe in some cases, and thus improvement is desired.

PTLs 1 and 2 disclose a configuration including a pipe main body, a liner inserted inside the pipe main body, and a heat insulating layer provided between the pipe main body and the liner.

Since the liner has a tubular shape with no welded portion in such a configuration, no corrosion product remains or no crack is generated in the welded portion, and thus the tile-shaped wear-resistant liner does not come off.

CITATION LIST

Patent Literature

[PTL 1] Japanese Examined Patent Application Publication No. 62-60595
[PTL 2] Japanese Patent No. 4397064

SUMMARY OF INVENTION

Technical Problem

However, in a configuration where the liner is provided inside the pipe main body as disclosed in PTLs 1 and 2, the raw syngas flowing in the liner has a high temperature of, for example, 400 to 500° C., thereby causing a thermal elongation difference between the liner and the pipe main body. Further, there is a large temperature difference between an outer peripheral side of the pipe main body, which is an outside air side, and an inside of the liner, through which the high-temperature raw syngas flows, and the thermal elongation of the pipe main body is small compared to the thermal elongation of the liner. Then, large stress acts on a portion of the pipe main body, which supports the liner, and thereby there is a possibility of a defect such as deformation and damage to the liner and a supporting portion thereof.

The present invention is devised in view of such circumstances, and an object thereof is to provide a pipe member, a gasification combined power generation device, and an assembling method for a pipe member, which ensure both of the wear resistance and corrosion resistance of a pipe main body with a liner while allowing suppression of an effect of a thermal elongation difference between the liner and a pipe main body.

Solution to Problem

According to a first aspect of the present invention, there is provided a pipe member that allows a fluid containing a solid to flow therein. The pipe member includes a tubular outer pipe, one or a plurality of tubular liners that are provided at an interval in a radial direction and are disposed side by side in series in a pipe axis direction inside the outer pipe, a first liner holding member that is provided on one end side of the outer pipe and holds the liner disposed on the one end side in a state where the liner is restrained in the pipe axis direction and a circumferential direction around a pipe axis, and a second liner holding member that is provided on the other end side of the outer pipe and holds the liner disposed on the other end side in a state where the liner is slidable in the pipe axis direction and is restrained in the circumferential direction.

In the configuration, both of the wear resistance and corrosion resistance of the pipe main body are ensured due to providing of the liner while the liner on one end side of the outer pipe is held to be restrained in the pipe axis direction and the circumferential direction around the pipe axis and the liner on the other end side of the outer pipe is held to be slidable in the pipe axis direction and to be restrained in the circumferential direction. Accordingly, an effect of a thermal elongation difference between the liner and the pipe main body, which occurs due to heat transfer from a high-temperature fluid flowing in the liner, can be suppressed inside the outer pipe.

In the first aspect, it is more suitable that the first liner holding member is provided on an outer peripheral side of the liner and has an engaging portion on an inner peripheral side, and an engaged portion with which the engaging portion is engaged is formed in an outer peripheral surface of the liner.

In the configuration, by engaging the engaging portion of the first liner holding member with the engaged portion of the liner, the liner can be held by the first liner holding member in a state of being restrained in the pipe axis direction and the circumferential direction around the pipe axis. For this reason, the wear resistance and corrosion resistance of the pipe main body can be prevented from reducing due to deviation from a regular position range of each liner and generation of an unnecessary gap, and it can be suppressed that the liner interferes with other parts and becomes damaged.

In the first aspect, it is more suitable that the second liner holding member is provided on an outer peripheral side of the liner and has a guide member that guides the liner in a slide movement direction along the pipe axis direction and is provided on an inner peripheral side, and a guided portion that is guided in a sliding direction by the guide member is formed in an outer peripheral surface of the liner.

In the configuration, as the guide member of the second liner holding member guides the liner in the sliding direction of the guided portion, the liner can be held by the second liner holding member in a state of being slidable in the pipe axis direction and being restrained in the circumferential direction. In addition, since the second liner holding member prevents a fluid flowing in the liner from coming into direct contact with the pipe main body, the wear resistance and corrosion resistance of the pipe main body can be prevented from reducing.

In the first aspect, it is more suitable that a flange portion that projects to an outer peripheral side is formed at the other end of the outer pipe, and an end portion of the liner on the other end side of the outer pipe where the flange portion is formed is offset to an inside in the pipe axis direction from an end surface of the outer pipe on the other end side.

In the configuration, even when the liner thermally elongates, it can be suppressed that the end portion of the liner protrudes from the outer pipe in the pipe axis direction. Therefore, even when a thermal elongation difference between the liner and the pipe main body occurs, the liner can be prevented from interfering and damaging the liner of another pipe member that is in front of or behind each other in the pipe axis direction.

In the first aspect, it is more suitable that a filling material that is placed between the outer pipe and the liner is further included.

In the first aspect, it is more suitable that a pipe base portion that is branched from the outer pipe is further included, and the pipe base portion includes a branch outer pipe that is branched from the outer pipe and a tubular branch liner that is fixed to the branch outer pipe.

In the first aspect, it is more suitable that the outer pipe has a curved portion that is formed to curve with a predetermined curvature radius, and a plurality of the liners that are formed to curve with the same curvature radius as the curved portion are inserted and disposed inside the outer pipe.

In the configuration, the curved portion can be suitably used in an elbow portion of the pipe which is curved in the pipe axis direction. In addition, since a configuration where the plurality of liners are inserted and disposed inside the outer pipe is adopted, the liner may be divided into parts each having a length that allows easy insertion and disposition in the outer pipe.

In the first aspect, it is more suitable that a plurality of the liners are provided in series along the pipe axis direction inside the outer pipe.

In the configuration, the length of each of the liners in the pipe axis direction is small compared to a case where the liner has the same length as the outer pipe. Accordingly, when inserting the liners into the outer pipe, handling for moving the liners in turn to provision positions is easy, thereby improving workability.

In the first aspect, it is more suitable that the first liner holding member holds an end portion of each of the plurality of liners on a downstream side in a flowing direction of the fluid in a state where the end portion is restrained in the pipe axis direction and the circumferential direction around the pipe axis.

In the configuration, the wear resistance and corrosion resistance of the pipe main body can be prevented from reducing as each of the liners rotates around the pipe axis so as to be deviated from a regular position range of each liner and an unnecessary gap is generated, and it can be suppressed that the liner interferes with other parts and becomes damaged.

In the first aspect, it is more suitable that grinding is performed on an inner peripheral surface of the liner through machining.

In the configuration, as grinding is performed on the inner peripheral surface of the liner, a corrosion reaction surface area decreases due to surface unevenness, and thus corrosion resistance can be improved. In addition, when manufacturing the liner through casting, impurities generated on the inner peripheral surface of the liner can be removed.

According to a second aspect of the present invention, there is provided a gasification combined power generation device including a gasifier facility that generates a raw syngas by combusting and gasifying a carbonaceous feedstock, a char recovery unit that recovers char included in the raw syngas generated by the gasifier facility, and a pipe portion that forms at least a part of a pipe, which connects the gasifier facility to the char recovery unit, and is formed by the pipe member according to the first aspect.

In the configuration, in at least a part of the pipe member configuring the pipe portion, the provision of the liner can ensure both of the wear resistance and corrosion resistance of the pipe main body while suppressing an effect of a thermal elongation difference between the liner and the pipe main body, which occurs due to heat transfer from a high-temperature fluid flowing in the liner.

According to a third aspect of the present invention, there is provided an assembling method for the pipe member according to the first aspect. The assembling method includes a step of attaching the first liner holding member to an inside of the outer pipe, a step of inserting the liner to the inside of the outer pipe, and a step of attaching the second liner holding member to the inside of the outer pipe.

In the configuration, the pipe member into which the liner is inserted and disposed can be easily assembled.

Advantageous Effects of Invention

In the present invention, it is possible to ensure both of the wear resistance and corrosion resistance of the pipe main body with the liner while suppressing an effect of a thermal elongation difference between the liner and the pipe main body.

DESCRIPTION OF EMBODIMENTS

Hereinafter, a pipe member, a gasification combined power generation device, and an assembling method for a pipe member according to an embodiment of the present invention will be described with reference to the drawings.

Figure 1:
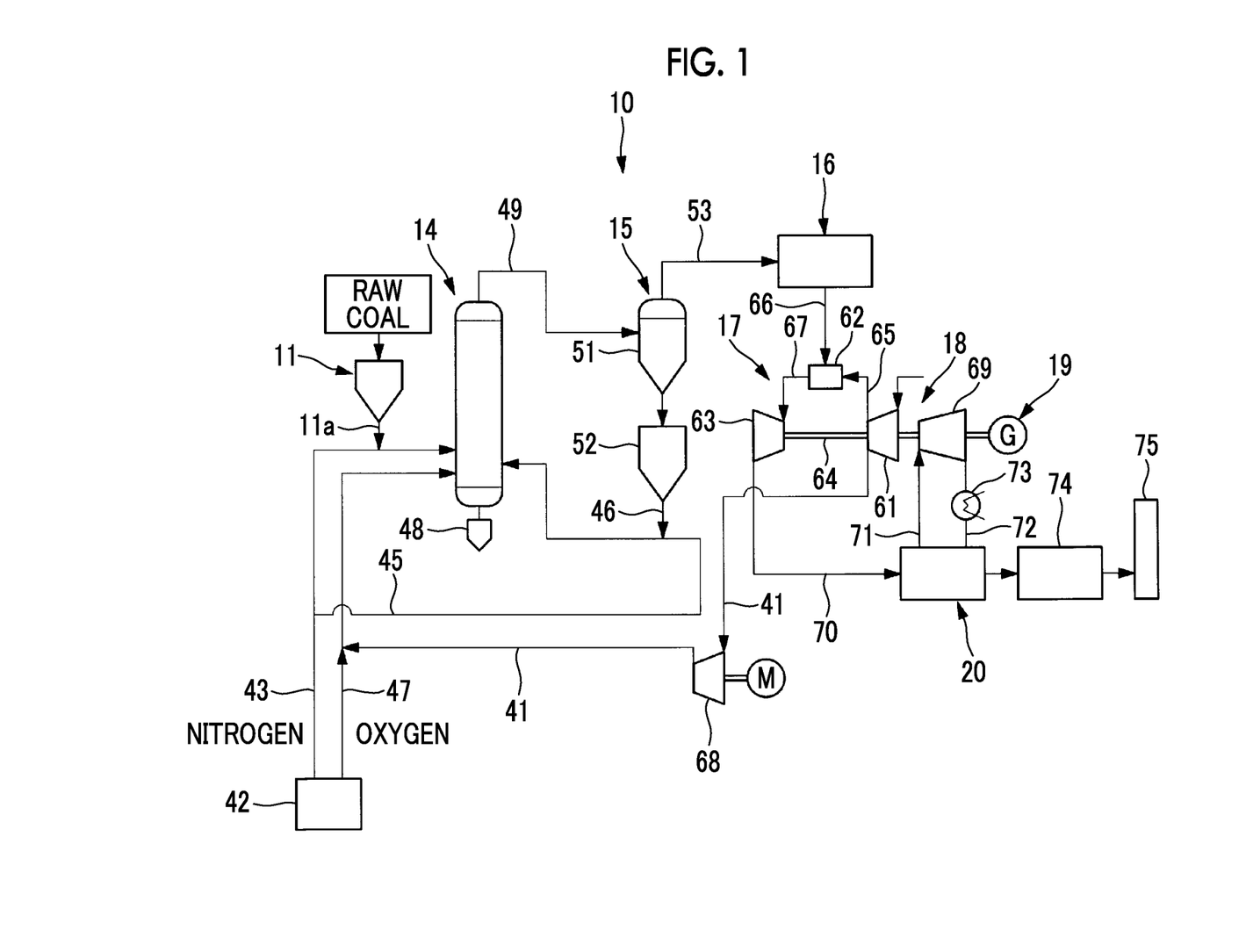
FIG. 1 is a schematic configuration diagram of a coal integrated gasification combined cycle to which a pipe member according to an embodiment of the present invention is applied.

FIG. 1 is a schematic configuration diagram of a coal integrated gasification combined cycle to which the pipe member according to the embodiment is applied.

A coal integrated gasification combined cycle (integrated coal gasification combined cycle (IGCC)) 10 to which a gasifier facility 14 according to the embodiment is applied uses air as an oxygen containing gas. An air combustion type in which a combustible gas (raw syngas) is generated from a fuel is adopted in the gasifier facility 14.

Then, the coal integrated gasification combined cycle 10 cleans the raw syngas generated in the gasifier facility 14 with the gas clean-up unit 16 and makes the raw syngas as a fuel gas. Thereafter, the coal integrated gasification combined cycle supplies the fuel gas to a gas turbine 17 to generate power. That is, the coal integrated gasification combined cycle 10 of the embodiment is an air combustion type (air blowing) power generation facility. As a fuel supplied to the gasifier facility 14, for example, a carbonaceous feedstock such as coal is used.

As shown in FIG. 1, the coal integrated gasification combined cycle (gasification combined power generation device) 10 includes a coal supplying facility 11, the gasifier facility 14, a char recovery unit 15, the gas clean-up unit 16, the gas turbine 17, a steam turbine 18, a generator 19, and a heat recovery steam generator (HRSG) 20.

The coal supplying facility 11 is supplied with coal, which is a carbonaceous feedstock, as raw coal, and pulverizes the coal in a coal mill (not shown) to produce pulverized coal, which is pulverized into fine particles. The pulverized coal produced in the coal supplying facility 11 is pressurized by a nitrogen gas which is a transporting inert gas supplied from an air separation unit 42 to be described later at an outlet of a coal supplying line 11a, and is supplied toward the gasifier facility 14. The inert gas is an inert gas having an oxygen content of approximately 5% by volume or less, and a nitrogen gas, a carbon dioxide gas, and an argon gas are typical examples. However, the inert gas is not necessarily limited to approximately 5% or less.

The gasifier facility 14 is supplied with the pulverized coal produced in the coal supplying facility 11, and char (unreacted content and ash content of coal) recovered by the char recovery unit 15 is returned and supplied thereto so as to be reusable.

In addition, a compressed air supply line 41 from the gas turbine 17 (compressor 61) is connected to the gasifier facility 14. A pressure of some of the compressed air, which is compressed by the gas turbine 17, is boosted by a booster 68 to a predetermined pressure to be suppliable to the gasifier facility 14. The air separation unit 42 generates nitrogen and oxygen by separating out from air in the atmosphere, and the air separation unit 42 and the gasifier facility 14 are connected to each other by a first nitrogen supply line 43. The coal supplying line 11a from the coal supplying facility 11 is connected to the first nitrogen supply line 43. In addition, also a second nitrogen supply line 45 branched from the first nitrogen supply line 43 is also connected to the gasifier facility 14, and a char return line 46 from the char recovery unit 15 is connected to the second nitrogen supply line 45. The air separation unit 42 is connected to the compressed air supply line 41 by an oxygen supply line 47. The nitrogen separated out by the air separation unit 42 is used as a coal or char transporting gas by flowing through the first nitrogen supply line 43 and the second nitrogen supply line 45. In addition, the oxygen separated out by the air separation unit 42 is used as an oxygen containing gas in the gasifier facility 14 by flowing through the oxygen supply line 47 and the compressed air supply line 41.

The gasifier facility 14 includes, for example, a two-stage spouted bed type gasifier. The gasifier facility 14 partially combusts coal (pulverized coal) and char, which are supplied therein, with an oxygen containing gas (air and oxygen) to gasify and make a raw syngas. The gasifier facility 14 is provided with a foreign substance removing facility 48 for removing foreign substances (slag) mixed in the pulverized coal. A gas generation line (pipe portion) 49 through which the raw syngas is supplied toward the char recovery unit 15 is connected to the gasifier facility 14, and the raw syngas containing the char can be discharged.

The char recovery unit 15 includes a dust collecting facility 51 and a feed hopper 52. In this case, the dust collecting facility 51 is configured by one or a plurality of cyclones or porous filters, and can separate out char included in a raw syngas generated in the gasifier facility 14. Then, the raw syngas from which the char is separated out is sent to the gas clean-up unit 16 through a gas discharge line 53. The feed hopper 52 stores the char separated out from the raw syngas by the dust collecting facility 51. A configuration where a bin is disposed between the dust collecting facility 51 and the feed hopper 52 and a plurality of feed hoppers 52 are connected to the bin may be adopted. The char return line 46 from the feed hopper 52 is connected to the second nitrogen supply line 45.

The gas clean-up unit 16 cleans a gas by removing impurities such as sulfur compounds and nitrogen compounds from a raw syngas from which char is separated out by the char recovery unit 15. Then, the gas clean-up unit 16 cleans the raw syngas to produce a fuel gas, and supplies the fuel gas to the gas turbine 17. Since a sulfur content ($H_2S$) is still included in the raw syngas from which the char is separated out, the gas clean-up unit 16 removes and recovers the sulfur content with an amine absorbing liquid to use effectively.

The gas turbine 17 includes the compressor 61, a combustor 62, and a turbine 63, and the compressor 61 and the turbine 63 are connected to each other by a rotary shaft 64. The combustor 62 is connected to a compressed air supply line 65 from the compressor 61, is connected to a fuel gas supply line 66 from the gas clean-up unit 16, and is connected to a combustion gas supply line 67 extending toward the turbine 63. In addition, the gas turbine 17 is provided with the compressed air supply line 41 extending from the compressor 61 to the gasifier facility 14, and is provided with the booster 68 midway. Therefore, in the combustor 62, some of compressed air supplied from the compressor 61 and at least some of a fuel gas supplied from the gas clean-up unit 16 are mixed and combusted to generate a combustion gas, and the generated combustion gas is supplied toward the turbine 63. Then, the turbine 63 rotationally drives the rotary shaft 64 with the supplied combustion gas to rotationally drive the generator 19.

The steam turbine 18 includes a turbine 69 connected to the rotary shaft 64 of the gas turbine 17, and the generator 19 is connected to a base end portion of the rotary shaft 64. The heat recovery steam generator 20 is connected to a flue gas line 70 from the gas turbine 17 (turbine 63) and generates steam by exchanging heat between feed water and a flue gas of the turbine 63. The heat recovery steam generator 20 is provided with a steam supply line 71 between the turbine 69 of the steam turbine 18 and the heat recovery steam generator, and is provided with a steam recovery line 72. A condenser 73 is provided on the steam recovery line 72. Therefore, the turbine 69 of the steam turbine 18 is rotationally driven by the steam supplied from the heat recovery steam generator 20, and the rotary shaft 64 is rotated to rotationally drive the generator 19.

A gas purifying facility 74 is provided from an outlet of the heat recovery steam generator 20 to a stack 75.

Herein, the workings of the coal integrated gasification combined cycle 10 of the embodiment will be described.

In the coal integrated gasification combined cycle 10 of the embodiment, when raw coal (coal) is supplied to the coal supplying facility 11, the coal becomes pulverized coal by being pulverized into fine particles in the coal supplying facility 11. The pulverized coal produced in the coal supplying facility 11 flows through the first nitrogen supply line 43 by nitrogen supplied from the air separation unit 42 and is supplied to the gasifier facility 14. In addition, char recovered by the char recovery unit 15 to be described later flows through the second nitrogen supply line 45 by the nitrogen supplied from the air separation unit 42 and is supplied to the gasifier facility 14. Further, after a pressure of the compressed air extracted from the gas turbine 17 to be described later is boosted by the booster 68, the compressed air is supplied to the gasifier facility 14 through the compressed air supply line 41 together with oxygen supplied from the air separation unit 42.

In the gasifier facility 14, supplied pulverized coal and char are combusted by compressed air (oxygen) and pulverized coal, and the char are gasified to generate a raw syngas.

In the char recovery unit 15, a raw syngas is first supplied to the dust collecting facility 51, such that fine char included in the raw syngas is separated out. Then, the raw syngas from which the char is separated out is sent to the gas clean-up unit 16 through the gas discharge line 53. On the other hand, the fine char separated out from the raw syngas is accumulated in the feed hopper 52, and is returned to the gasifier facility 14 through the char return line 46 so as to be recycled.

A raw syngas from which char is separated out by the char recovery unit 15 is subjected to gas cleaning in the gas clean-up unit 16 as impurities such as sulfur compounds and nitrogen compounds are removed, and thereby a fuel gas is produced. The compressor 61 generates compressed air and supplies the compressed air to the combustor 62. The combustor 62 mixes the compressed air supplied from the compressor 61 with the fuel gas supplied from the gas clean-up unit 16 and combusts the mixture to generate a combustion gas. By rotationally driving the turbine 63 with the combustion gas, the compressor 61 and the generator 19 are rotationally driven via the rotary shaft 64. In this manner, the gas turbine 17 can generate power.

The heat recovery steam generator 20 generates steam by exchanging heat between a flue gas discharged from the turbine 63 of the gas turbine 17 and feed water, and supplies the generated steam to the steam turbine 18. As the turbine 69 of the steam turbine 18 is rotationally driven by the steam supplied from the heat recovery steam generator 20, the generator 19 can be rotationally driven via the rotary shaft 64 and power can be generated.

The gas turbine 17 and the steam turbine 18 may not rotationally drive one generator 19 with the same shaft, and may rotationally drive a plurality of generators with different shafts.

After then, harmful substances of an exhaust gas discharged from the heat recovery steam generator 20 are removed by the gas purifying facility 74, and the purified exhaust gas is released from the stack 75 to the atmosphere.

In the coal integrated gasification combined cycle 10 of the embodiment, at least a part of the gas generation line 49 and the char return line 46 through which a raw syngas that is discharged from the gasifier facility 14 and is supplied to the char recovery unit 15 passes has the following configuration.

Figure 2:
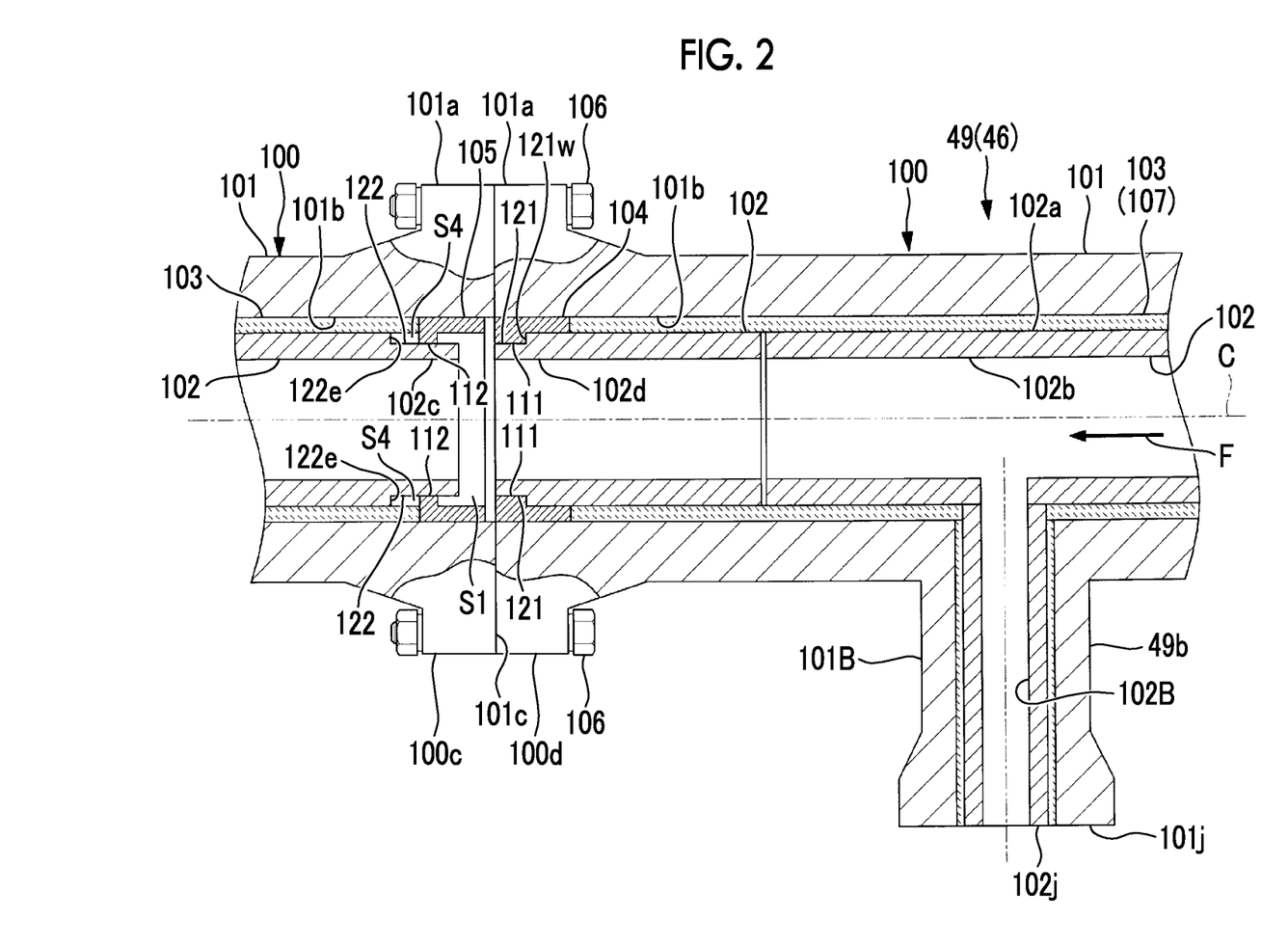
FIG. 2 is a sectional view illustrating a configuration of the pipe member according to the embodiment of the present invention.

As illustrated in FIG. 2, at least a part of the gas generation line 49 and the char return line 46 is formed by connecting a plurality of pipe members 100 in series.

Each of the pipe members 100 is a straight tube, and includes an outer pipe 101, a liner 102 which is inserted and disposed inside the outer pipe 101, a fireproof material (filling material) 103 which is placed between the outer pipe 101 and the liner 102, a first liner holding member 104 which is provided at one end of one or a plurality of the liners 102 arranged in series, and a second liner holding member 105 which is provided at the other end thereof.

The fireproof material 103 may not be provided with filling omitted depending on the flow rate of a passing gas and the usage environment, in some cases.

The outer pipe 101 has a tubular shape and is formed of, for example, low alloy steel and carbon steel. The outer pipe 101 has flange portions 101a that project to an outer peripheral side at both end portions in a pipe axis C direction thereof, respectively. In a direction in which the gas generation line 49 is continuous, the outer pipes 101 and 101 that are in front of or behind each other are fastened to each other by bolts and nuts 106 in a state where the flange portions 101a and 101a facing each other. In the embodiment, such outer pipes 101 are large pipes each having an outer diameter of, for example, 500 to 1000 mm and a wall thickness of 15 to 30 mm.

The liner 102 has a tubular shape and has an outer diameter set to be smaller than an inner diameter of the outer pipe 101 by a predetermined dimension. Accordingly, an annular gap 107 is formed between an outer peripheral surface 102a of the liner 102 and an inner peripheral surface 101b of the outer pipe 101. The gap 107 is, for example, 10 to 20 mm in the embodiment.

In the embodiment, the liner 102 is formed through centrifugal casting with the use of, for example, chromium-containing cast iron (25Cr cast iron steel), and preferably has wear resistance to char (solid) and heat resistance and corrosion resistance to a high-temperature raw syngas flowing in the gas generation line 49. As other materials for the liner 102, it is preferable to appropriately select and form from, for example, a nickel-based alloy (Inconel (registered trademark) 625), a nickel-containing alloy (SUS316), and a ceramic material (alumina cement), based on a usage environment temperature. In addition, the liner 102 has a wall thickness of 15 to 30 mm in the embodiment.

After casting an inner peripheral surface 102b of the liner 102, it is preferable that impurities generated when casting the liner 102 is removed from the inner peripheral surface 102b by grinding through machining. Herein, in a case of forming the liner 102 through sand mold casting, impurities are generated at end portions of the liner 102. Thus, it is preferable to remove the impurities by grinding the end portions through machining.

In addition, in order to enhance workability by reducing friction and catching when being inserted into the outer pipe 101, it is also preferable to smooth the outer peripheral surface 102a of the liner 102 by grinding through machining.

Although the liner 102 may have the same pipe length as the outer pipe 101 and one liner may be used, the liner may be used by being divided into the plurality of liners 102, which are shorter than the pipe length of the outer pipe 101 and are disposed in series side by side, in the outer pipe 101 as illustrated in FIG. 2.

In a case of disposing the plurality of liners 102 in series in the outer pipe 101, the liners 102 and 102 that are in front of or behind each other in the pipe axis C direction may abut against each other such that no gap is generated. By not generating an unnecessary gap, the wear resistance and corrosion resistance of the outer pipe 101 can be prevented from reducing.

The fireproof material 103 fills the gap 107 between the outer peripheral surface 102a of the liner 102 and the inner peripheral surface 101b of the outer pipe 101, and fixes the liner 102 so as not to be shifted in a radial direction. As such a fireproof material 103, for example, a ceramic material (alumina cement) can be used. In addition, a joint material can also be used insofar as the material does not soften due to a temperature rise caused by a high-temperature raw syngas flowing in the gas generation line 49.

The first liner holding member 104 of the pipe member 100 is disposed at an end portion (one end) 100d in the vicinity of the flange portion 101a on a downstream side in a flowing direction F of a raw syngas in the gas generation line 49. In the liner 102 disposed at the end portion 100d, the first liner holding member 104 is disposed on the outer peripheral side of an end portion 102d on the downstream side in the flowing direction F. The first liner holding member 104 may have an annular shape and be bonded and fixed to the inner peripheral surface 101b of the outer pipe 101 through, for example, welding.

Figure 3:
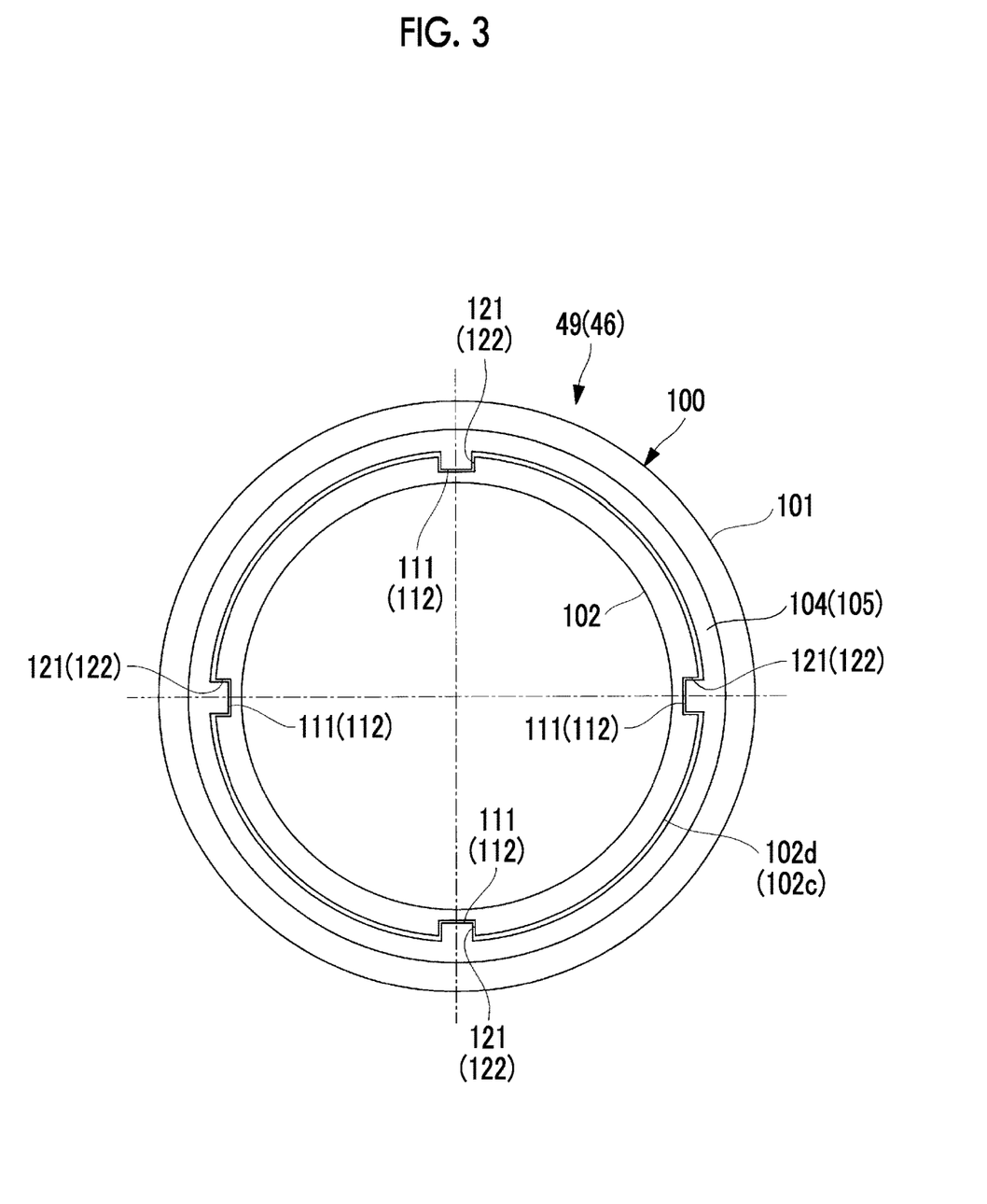
FIG. 3 is a sectional view orthogonal to a pipe axis direction of the pipe member according to the embodiment of the present invention.

As illustrated in FIG. 3, in the first liner holding member 104, a plurality of, for example, four protrusions (engaging portions) 111 that protrude to an inner peripheral side are integrally formed at intervals in a circumferential direction.

On the other hand, a recessed groove (engaged portion) 121 is formed at a position corresponding to each of the protrusions 111 in an outer peripheral surface of the end portion 102d of the liner 102 on the downstream side. As illustrated in FIG. 2, at the end portion 102d of the liner 102, each of the recessed grooves 121 is open toward the downstream side in the flowing direction F, and an abutting wall portion 121w orthogonal to the pipe axis C direction is formed on an upstream side in the flowing direction F. Each of the protrusions 111 of the first liner holding member 104 is inserted into the recessed groove 121 while abutting against the abutting wall portion 121w. For this reason, the liner 102 inserted inside the first liner holding member 104 is restrained from moving to the downstream side in the flowing direction F along the pipe axis C direction and moving in the circumferential direction. Accordingly, by not generating an unnecessary gap, the wear resistance and corrosion resistance of the outer pipe 101 can be prevented from reducing.

The second liner holding member 105 of the pipe member 100 is disposed at an end portion (the other end) 100c on the upstream side in the flowing direction F of a raw syngas in the gas generation line 49. The first liner holding member 104 is disposed on the outer peripheral side of an end portion 102c of the liner 102 on the upstream side in the flowing direction F. The second liner holding member 105 has an annular shape and is bonded to the inner peripheral surface 101b of the outer pipe 101 through welding.

The first liner holding member 104 and the second liner holding member 105 are formed of, for example, a material having corrosion resistance, abrasion resistance, and heat resistance. For example, it is preferable to select and form from, for example, a nickel-based alloy (Inconel (registered trademark) 625), a nickel-containing alloy (SUS316), and low alloy steel (1 chrome steel), based on a usage environment temperature.

In the second liner holding member 105, a plurality of, for example, four protrusions (guide portions) 112 that protrude to the inner peripheral side are integrally formed at intervals in the circumferential direction.

On the other hand, a guide groove (guided portion) 122 that is continuous in the pipe axis C direction is formed at a position corresponding to each of the protrusions 112 in an outer peripheral surface of the end portion 102c of the liner 102 on the upstream side. The guide groove 122 has a length in the pipe axis C direction larger than the length of the protrusion 112. In addition, a gap S4 in the pipe axis C direction is formed between the protrusion 112 of the second liner holding member 105 and a terminal end 122e of the guide groove 122 on the downstream side in the flowing direction F.

Herein, at the end portion 100c of the pipe member 100, the end portion 102c on the upstream side in the flowing direction F is provided to be positioned to be offset to the downstream side in the flowing direction F from an end surface 101c of the outer pipe 101 on the upstream side in the flowing direction F. The end portion 102c on the upstream side in the flowing direction F is at the other end of the liner 102 positioned on the upstream side in the flowing direction F in which one or the plurality of liners 102 are disposed in series side by side. Accordingly, a gap S1 in the pipe axis C direction is formed between the end portion 102c of the liner 102 and the end surface 101c of the outer pipe 101 in the vicinity of the flange portion 101a. Even when the end portion 102c of the liner 102 on the upstream side in the flowing direction F slides in the pipe axis C direction due to a thermal elongation difference, the gap S1 allows suppressing of the end portion 102c jutting out to the upstream side in the flowing direction F from the end surface 101c of the outer pipe 101. That is, a thermal elongation difference between another liner 102 on the downstream side in the flowing direction F and the outer pipe 101 is allowed, the liner 102 suppresses interference with other parts and damage, and thereby an effect thereof can be suppressed.

At this time, the gap S1 is set to be the same as or slightly larger than the gap S4 described above, and the thermal elongation difference is more reliably allowed. Thus, an effect thereof can be suppressed.

As described above, each of the protrusions 112 of the second liner holding member 105 meshes with the guide groove 122. Accordingly, the liner 102 inserted inside the second liner holding member 105 is held in a state of being slidable in the pipe axis C direction along the guide groove 122 and being restrained from moving in the circumferential direction. Accordingly, by not generating an unnecessary gap, the wear resistance and corrosion resistance of the outer pipe 101 can be prevented from reducing. In addition, since the second liner holding member 105 prevents a fluid flowing in the liner from coming into direct contact with the outer pipe 101 in the gap S1, the wear resistance and corrosion resistance of the outer pipe 101 can be prevented from reducing.

As described above, by providing the first liner holding member 104 and the second liner holding member 105, one or each of the plurality of liners 102 inserted and disposed in the outer pipe 101 of the pipe member 100 is configured such that movement of the end portion 102d, which is on the downstream side in the flowing direction F, in the pipe axis C direction is restricted. In the restricted state, the end portion 102c on the upstream side in the flowing direction F is movably held in the pipe axis C direction. The movement is allowed by the gaps S1 and S4 without interfering with other parts. Accordingly, in a case where a thermal elongation difference in the pipe axis C direction between the outer pipe 101 and the liner 102 occurs due to heat transfer from a high-temperature raw syngas flowing in the liner 102, the liner 102 extends toward the upstream side in the flowing direction F. In addition, the end portion 102c of the liner 102 on the upstream side in the flowing direction F slides to the upstream side in the flowing direction F.

However, in the middle of the gas generation line 49, a pipe base portion 49b having a small pipe length is provided so as to be branched from the outer pipe 101 in some cases. The pipe base portion 49b includes a branch outer pipe 101B branched from the outer pipe 101 and a tubular branch liner 102B fixed to the branch outer pipe 101B. As the tubular branch liner 102B is inserted and disposed inside the branch outer pipe 101B, the pipe base portion 49b ensures the wear resistance and corrosion resistance of the branch outer pipe 101B. In addition, the fireproof material 103 may be provided in an annular gap formed between an outer peripheral surface of the branch liner 102B and an inner peripheral surface of the branch outer pipe 101B of the pipe base portion 49b.

The pipe base portion 49b can also be configured such that an end portion 102j of the branch liner 102B is directly fixed to an end portion 101j of the branch outer pipe 101B through, for example, welding, and the first liner holding member 104 or the second liner holding member 105 is omitted. In this case, the branch liner 102B is made of a material having corrosion resistance and wear resistance. In the embodiment, for example, it is preferable to select and form from, for example, a nickel-based alloy (Inconel (registered trademark) 625), a nickel-containing alloy (SUS316), and low alloy steel (1 chrome steel), based on a usage environment temperature. Accordingly, a structure of the pipe base portion 49b can be simplified.

First Modification Example of Embodiment

Figure 4:
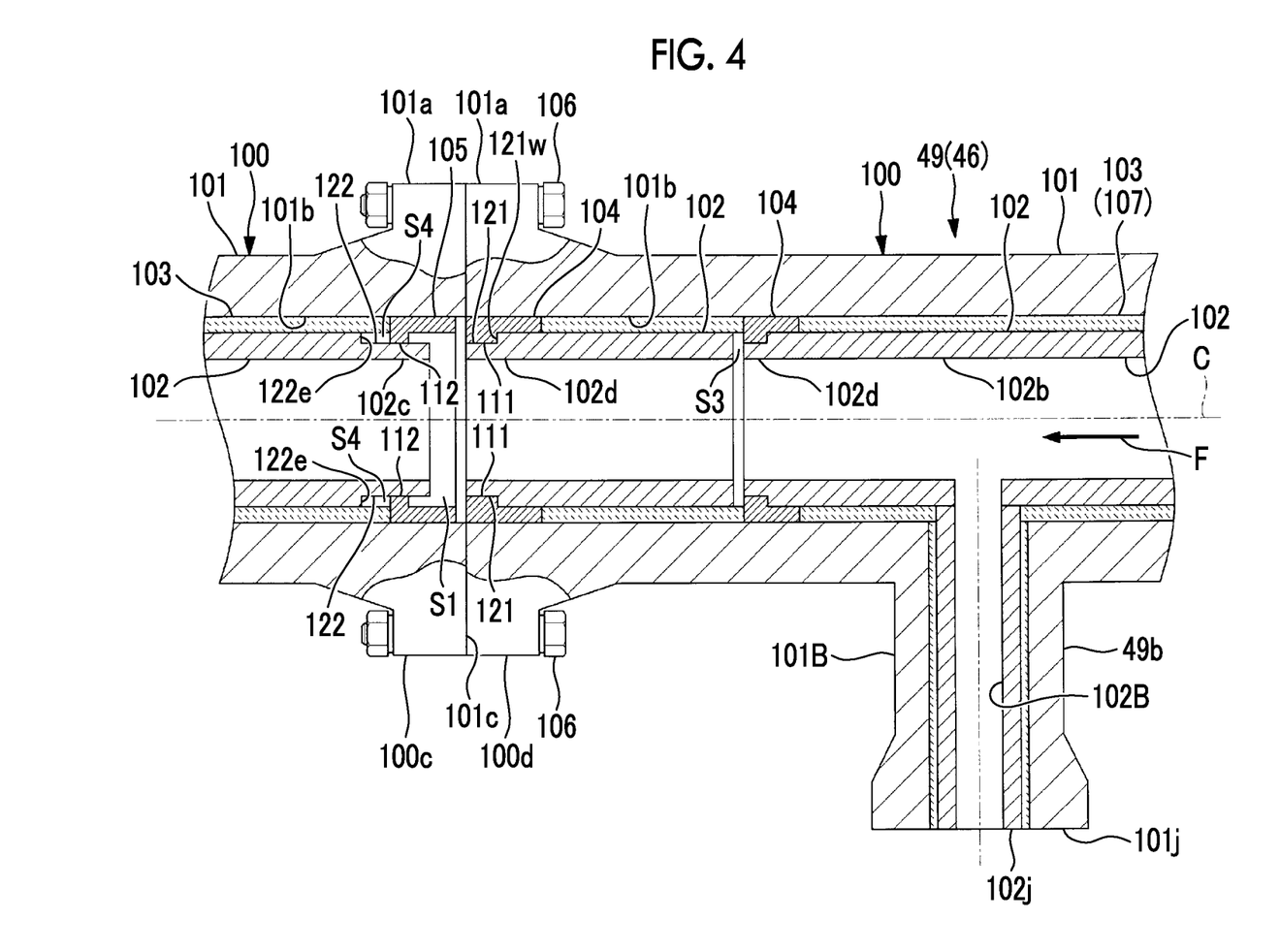
FIG. 4 is a sectional view illustrating another configuration of the pipe member according to the embodiment of the present invention.

As illustrated in FIG. 4, in a case of disposing the plurality of liners 102 in series in the outer pipe 101, the first liner holding member 104 may be provided not only at the end portion 100d of the pipe member 100 on the downstream side in the flowing direction F but also on the outer peripheral side of the end portion 102d of at least one of the other liners 102 on the downstream side in the flowing direction F. In addition, other configurations and relationships thereof are the same as in the embodiment illustrated in FIGS. 2 and 3.

In this case, a gap S3 is provided in the pipe axis C direction between the first liner holding member 104 and the other liner 102 positioned on the downstream side in the flowing direction F from the first liner holding member 104. Accordingly, a thermal elongation difference between the other liner 102 on the downstream side and the outer pipe 101 is allowed, and thereby an effect thereof can be suppressed.

In addition, the number of end portions 102d of each of the plurality of liners 102 on the downstream side in the flowing direction F of a fluid, which is held by the first liner holding member 104 in a state of being restrained in the pipe axis C direction and a circumferential direction around the pipe axis C, increases. In addition, the number of end portions 102d in a state of not being restrained by the first liner holding member 104 in the pipe axis C direction and the circumferential direction around the pipe axis C decreases. Therefore, the number of liners 102 not supported by the first liner holding member 104 and the second liner holding member 105 decreases, and it can be suppressed that the unsupported liner 102 rotates around the pipe axis C and an unnecessary gap is generated.

Second Modification Example of Embodiment

Figure 5:
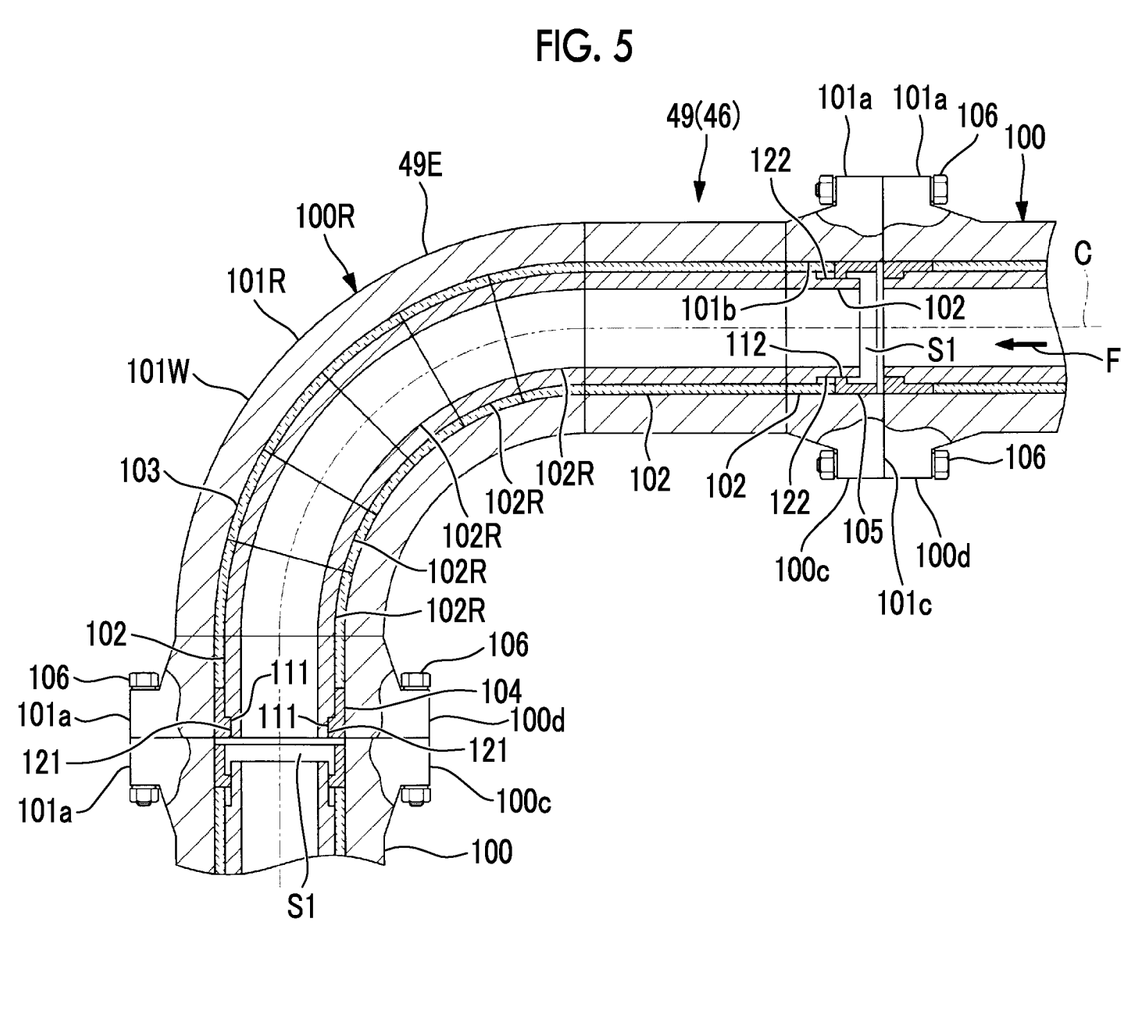
FIG. 5 is a sectional view illustrating still another configuration of the pipe member according to the embodiment of the present invention.

In addition, as illustrated in FIG. 5, in at least a part of the gas generation line 49 and the char return line 46, a pipe member 100R used in an elbow portion 49E at which the pipe axis C direction curves may be used. The pipe member 100R includes an outer pipe 101R that has a curved portion 101w, which is formed to curve with a predetermined curvature radius, and a plurality of liners 102R which are inserted and disposed in series along the pipe axis C direction inside the outer pipe 101R. In addition, the pipe member 100R may include the fireproof material 103 filling between the outer pipe 101R and a liner 102R. In addition, other configurations and relationships thereof are the same as in the embodiment illustrated in FIGS. 2 and 3.

The plurality of liners 102R each are formed to curve with the same curvature radius as the curved portion 101w of the outer pipe 101R, and are divided to have a length that allows easy insertion and disposition in the outer pipe 101R. In the curved portion 101w of the outer pipe 101R, the liners 102R and 102R that are in front of or behind each other in the pipe axis C direction abut against each other. Accordingly, by not generating an unnecessary gap, the wear resistance and corrosion resistance of the outer pipe 101R can be prevented from reducing. In addition, as an effect of a thermal elongation difference between the other liner 102R on the downstream side in the flowing direction F and the outer pipe 101R is suppressed, it can be suppressed that the liner 102R interferes with other parts and becomes damaged.

In addition, both end portions of the curved portion 101w of the outer pipe 101R in the pipe axis C direction are straight pipes, and the liners 102, which are straight pipes, are inserted and disposed in the portions as in FIG. 2.

At both end portions of the pipe member 100R in the flowing direction F, the first liner holding member 104 and the second liner holding member 105 are provided just as the pipe member 100, which is a straight pipe.

Each of the first liner holding member 104 and the second liner holding member 105 may be bonded to the inner peripheral surface 101b of the outer pipe 101R through welding.

The liner 102 of the pipe member 100R, which is disposed at the end portion 100d on the downstream side in the flowing direction F, is held by the first liner holding member 104 in a state of being restrained from moving to the downstream side in the flowing direction F and moving in the circumferential direction.

The liner 102 of the pipe member 100R, which is disposed at the end portion 100c on the upstream side in the flowing direction F, is held by the second liner holding member 105 in a state of being slidable along the flowing direction F and being restrained from moving in the circumferential direction.

Accordingly, by not generating an unnecessary gap, the wear resistance and corrosion resistance of the outer pipe 101B can be prevented from reducing.

[Manufacturing Method for Pipe Member]

Next, a manufacturing method for the pipe members 100 and 100R described above will be described.

To manufacture the pipe members 100 and 100R, first, the first liner holding member 104 is attached at a predetermined position on an inside of the end portion 100d of each of the outer pipes 101 and 101B on the downstream side in the flowing direction F, and is fixed to the outer pipes 101 and 101R through welding.

Next, the liners 102 and 102R are inserted and disposed inside the outer pipes 101 and 101R from an end portion 100c side on the upstream side in the flowing direction F.

After a predetermined number of liners 102 and 102R, that is one or a plurality of liners arranged in series, are inserted, the second liner holding member 105 is attached on the inside of the end portion 100c of each of the outer pipes 101 and 101R on the upstream side of the flowing direction F, and is fixed to the outer pipes 101 and 101R through welding.

After then, the fireproof material 103 fills the gap 107 between the liners 102 and 102R and the outer pipes 101 and 101B, and is cured.

Accordingly, the pipe members 100 and 100R are manufactured.

In the manufacturing method, the second liner holding member 105 may be attached after the filling of the fireproof material 103. In addition, in a case where the fireproof material 103 can be omitted, a filling step may not be performed.

In the configuration described above, the liner 102 is held to be restrained in the pipe axis C direction and the circumferential direction around the pipe axis C on the end portion 100d side of the outer pipe 101, and the liner 102 is held to be slidable in the pipe axis C direction and to be restrained in the circumferential direction on the end portion 100c of the outer pipe 101. Accordingly, an effect of a thermal elongation difference between the liner 102 and the outer pipe 101, which occurs due to heat transfer from a high-temperature fluid flowing in the liner 102, is suppressed while the liner 102 ensures both of the wear resistance and corrosion resistance of the outer pipe 101. In addition, the wear resistance and corrosion resistance of the outer pipe 101B can be prevented from reducing due to deviation from a regular position range of each liner 102 and generation of an unnecessary gap. In addition, the occurrence of damage due to interference between the respective liners 102 can be prevented.

That is, by engaging the protrusions 111 of the first liner holding member 104 with the recessed grooves 121 of the liner 102, the liner 102 can be held by the first liner holding member 104 in a state of being restrained in the pipe axis C direction and the circumferential direction around the pipe axis C.

In addition, as the protrusions 112 of the second liner holding member 105 guide in a sliding direction of the guide grooves 122 for the liner 102, the liner 102 can be held by the second liner holding member 105 in a state of being slidable in the pipe axis C direction and being restrained in the circumferential direction.

Further, the end portion 102c of the liner 102 on an end portion 100c side of the outer pipe 101 is offset to the inside along the pipe axis C from the end surface 101c, which is the end portion 100c side of the outer pipe 101. For this reason, even when a thermal elongation difference between the liner 102 and the outer pipe 101 occurs, it can be suppressed that the end portion 102c of the liner 102 protrudes from the outer pipe 101 in the pipe axis C direction. Therefore, even when the thermal elongation difference between the liner 102 and the outer pipe 101 occurs, the liner can be prevented from interfering and damaging the liner 102 of another pipe member 100 that is in front of or behind each other in the pipe axis C direction.

In addition, the plurality of liners 102 are provided inside the outer pipe 101 in series along the pipe axis C direction. In such a pipe member 100, the length of each of the liners 102 in the pipe axis C direction is small compared to a case where the liner 102 has the same length as the outer pipe 101. Accordingly, when inserting the liner 102 into the outer pipe 101, the liner 102 is easily handled and workability improves.

Further, in a case where one or the plurality of liners 102 are arranged in series, the end portion 102d on the downstream side in the flowing direction of a fluid may be held by the first liner holding member 104 in a state of being restrained in the pipe axis C direction and the circumferential direction around the pipe axis C. In such a pipe member 100, since the number of the liners 102 that are not supported by the first liner holding member 104 and the second liner holding member 105 can be decreased, each of the liners 102 can be prevented from rotating around the pipe axis C. Accordingly, the occurrence of damage due to interference between the respective liners 102 can be prevented.

In addition, when manufacturing the liner 102 through casting, impurities generated on the inner peripheral surface of the liner 102 can be removed.

In addition, an assembling method for the pipe member 100 described above has a step of attaching the first liner holding member 104 to the inside of the outer pipe 101, a step of inserting the liner 102 inside the outer pipe 101, a step of attaching the second liner holding member 105 to the inside of the outer pipe 101, and a step of filling a gap between the outer pipe 101 and the liner 102 with the fireproof material 103.

Under such an assembling method for the pipe member 100, the pipe member 100 can be easily assembled.

Although the pipe members 100 and 100R are applied to at least a part of the gas generation line 49 and the char return line 46 through which a raw syngas is supplied toward the char recovery unit 15 in the embodiment, the invention is not limited thereto. For example, it is also possible to configure the first nitrogen supply line 43, through which pulverized coal is supplied from the coal supplying facility 11 to the gasifier facility 14, and the second nitrogen supply line 45, through which char recovered by the char recovery unit 15 is supplied to the gasifier facility 14, with the pipe members 100 and 100R described above.

In addition, although the first liner holding member 104 and the second liner holding member 105 each have an annular shape in the embodiment, the present invention is not limited to the example. Insofar as the liner 102 can be held inside the outer pipes 101 and 101B, the first liner holding member 104 and the second liner holding member 105 may be divided into a plurality of parts in the circumferential direction and be provided at an interval in the circumferential direction.

In addition, although the pipe members 100 and 100R are used in the coal integrated gasification combined cycle 10 in the embodiment, the pipe members may be used in plants other than the coal integrated gasification combined cycle 10.

In addition, although coal is used as a fuel in the embodiment described above, high rank coal and low rank coal are also applicable, and without being limited to coal, biomass used as a renewable organic resource derived from living organisms may be used, and it is also possible to use, for example, thinned wood, waste wood, driftwood, grass, waste, sludge, tires, and recycled fuels (pellets and chips) made from these materials.

REFERENCE SIGNS LIST 10 coal integrated gasification combined cycle (gasification combined power generation device)
11 coal supplying facility
11a coal supplying line
14 gasifier facility
15 char recovery unit
16 gas clean-up unit
17 gas turbine
18 steam turbine
19 generator
20 heat recovery steam generator
41 compressed air supply line
42 air separation unit
43 first nitrogen supply line
45 second nitrogen supply line
46 char return line
47 oxygen supply line
48 foreign substance removing facility
49 gas generation line (pipe portion)
49E elbow portion
49b pipe base portion
51 dust collecting facility
52 feed hopper
53 gas discharge line
61 compressor
62 combustor
63 turbine
64 rotary shaft
65 compressed air supply line
66 fuel gas supply line
67 combustion gas supply line
68 booster
69 turbine
70 flue gas line
71 steam supply line
72 steam recovery line
73 condenser
74 gas purifying facility
75 stack
100 pipe member
100R pipe member
100c end portion (the other end)
100d end portion (one end)
101 outer pipe
101B branch outer pipe
101R outer pipe
101a flange portion
101b inner peripheral surface
101c end surface
101j end portion
101w curved portion
102 liner
102B branch liner
102R liner
102a outer peripheral surface
102b inner peripheral surface
102c end portion
102d end portion
102j end portion
103 fireproof material (filling material)
104 first liner holding member
105 second liner holding member
106 bolts and nuts
107 gap
111 protrusion (engaging portion)
112 protrusion (guide portion)
121 recessed groove (engaged portion)
121w abutting wall portion
122 guide groove (guided portion)
122e terminal end
C pipe axis
F flowing direction
S1 gap
S3 gap
S4 gap

The invention claimed is:

1. A pipe structure formed by connecting a plurality of pipe members that allow a fluid containing a solid to flow therein, the pipe member comprising:
a tubular outer pipe;
a liner structure that is disposed inside the outer pipe;
a first liner holding member that is provided on one end side of the outer pipe and holds one end of the liner structure in a state where the liner is restrained in a pipe axis direction and a circumferential direction around a pipe axis; and
a second liner holding member that is provided on the other end side of the outer pipe and holds the other end of the liner structure in a state where the liner structure is slidable in the pipe axis direction and is restrained in the circumferential direction, the second liner holding member being formed in an annular shape, wherein
a gap along the pipe axis direction is formed between an end portion of the liner structure included in a second pipe member among the plurality of pipe members and an end surface of the outer pipe included in a first pipe member among the plurality of pipe members in a state where one end of the first pipe member and one end of the second pipe member facing each other, the first liner holding member being provided on one end of the first pipe member, the second liner holding member being provided on one end of the second pipe member, and
the second liner holding member included in the second pipe member is disposed on an outer peripheral side of the gap in a state where the second liner holding member contacts with an inner peripheral surface of the outer pipe included in the second pipe member.

2. The pipe structure according to claim 1, wherein
the first liner holding member is formed in an annular shape and disposed in a state where the first liner holding member contacts with the inner peripheral surface of the outer pipe.

3. The pipe structure according to claim 1,
wherein the first liner holding member is provided on an outer peripheral side of the liner structure and has an engaging portion on an inner peripheral side, and
an engaged portion with which the engaging portion is engaged is formed in an outer peripheral surface of the liner structure.

4. The pipe structure according to claim 1,
wherein the second liner holding member is provided on an outer peripheral side of the liner structure and has a guide portion that guides the liner structure in a slide movement direction along the pipe axis direction and is provided on an inner peripheral side, and
a guided portion that is guided in a sliding direction by the guide portion is formed in an outer peripheral surface of the liner structure.

5. The pipe structure according to claim 4, wherein the guide portion is disposed in a state where a interval is provided between the guide portion and a terminal end of the guided portion,
the gap is set equal to or more than the interval.

6. The pipe structure according to claim 1, wherein a flange portion that projects to an outer peripheral side is formed at the other end of the outer pipe, and
an end portion of the liner structure on the other end side of the outer pipe where the flange portion is formed is offset to an inside in the pipe axis direction from an end surface of the outer pipe on the other end side.

7. The pipe structure according to claim 1, further comprising:
a filling material that is placed between the outer pipe and the liner structure.

8. The pipe structure according to claim 1, further comprising:
a pipe base portion that is branched from the outer pipe, and
wherein the pipe base portion includes a branch outer pipe that is branched from the outer pipe and a tubular branch liner that is fixed to the branch outer pipe.

9. The pipe structure according to claim 1,
wherein the outer pipe has a curved portion that is formed to curve with a predetermined curvature radius,
the liner structure including a plurality of tubular liners disposed side by side in series in the pipe axis direction, and
a plurality of the liners that are formed to curve with the same curvature radius as the curved portion are inserted and disposed inside the outer pipe.

10. The pipe structure according to claim 1,
wherein the liner structure includes a plurality of tubular liners provided in series along the pipe axis inside the outer pipe.

11. The pipe structure according to claim 10,
wherein the first liner holding member holds an end portion of each of the plurality of liners on a downstream side in a flowing direction of the fluid in a state where the end portion is restrained in the pipe axis direction and the circumferential direction around the pipe axis.

12. The pipe structure according to claim 1,
wherein grinding is performed on an inner peripheral surface of the liner structure through machining.

13. The pipe structure according to claim 1,
wherein the liner structure includes a plurality of tubular liners disposed side by side in series in the pipe axis direction.

14. A gasification combined power generation device comprising:
a gasifier facility that generates a raw syngas by combusting and gasifying a carbonaceous feedstock;
a char recovery unit that recovers char included in the raw syngas generated by the gasifier facility; and
a pipe portion that forms at least a part of a pipe, which connects the gasifier facility to the char recovery unit, and is formed by the pipe structure according to claim 13.

15. An assembling method for the pipe structure according to claim 1, the assembling method comprising:
a step of attaching the first liner holding member to an inside of the outer pipe;
a step of inserting the liner structure to the inside of the outer pipe; and
a step of attaching the second liner holding member to the inside of the outer pipe.

* * * * *